(12) United States Patent
Lee et al.

(10) Patent No.: US 12,346,996 B2
(45) Date of Patent: Jul. 1, 2025

(54) TERMINAL DISPLAYING DYEING SIMULATION AND OPERATION METHOD THEREOF

(71) Applicant: LG FAROUK CO., Seoul (KR)

(72) Inventors: Jung Yong Lee, Seoul (KR); Hyung Kyu Kim, Seoul (KR); Kyung Sik Jang, Seoul (KR)

(73) Assignee: LG FAROUK CO., Seoul (KR)

( * ) Notice: Subject to any disclaimer, the term of this patent is extended or adjusted under 35 U.S.C. 154(b) by 757 days.

(21) Appl. No.: 17/570,569

(22) Filed: Jan. 7, 2022

(65) Prior Publication Data

US 2022/0351429 A1 Nov. 3, 2022

(30) Foreign Application Priority Data

May 3, 2021 (KR) .......................... 10-2021-0057427

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01); *G06T 2207/10024* (2013.01)

(58) Field of Classification Search
CPC ..................... G06T 11/001; G06T 7/90; G06T 2207/10024; G06T 11/00; G06T 1/20; G06T 5/00; G06T 7/30
See application file for complete search history.

(56) References Cited

U.S. PATENT DOCUMENTS

| 7,758,347 B2 | 7/2010 | Sasaki |
| 10,012,588 B2 | 7/2018 | Miklatzky et al. |
| 11,037,335 B2 * | 6/2021 | Lee .......................... G06T 11/60 |
| 2007/0184415 A1 * | 8/2007 | Sasaki .................. A45D 44/005 434/100 |
| 2012/0075331 A1 * | 3/2012 | Mallick ................ G06V 40/162 345/594 |
| 2015/0091938 A1 | 4/2015 | Mallick et al. |
| 2020/0175729 A1 | 6/2020 | Lee et al. |
| 2022/0245774 A1 * | 8/2022 | Yu ............................ G09G 5/10 |
| 2022/0351429 A1 * | 11/2022 | Lee ........................ G06T 11/001 |

(Continued)

FOREIGN PATENT DOCUMENTS

| JP | 2005-274928 A | 10/2005 |
| JP | 2007-299113 A | 11/2007 |

(Continued)

OTHER PUBLICATIONS

Farouk Systems, Inc, "Introducing the Innovative LG CHI Color Master Factory", Facebook, Mar. 3, 2022, pp. 1-8, https://www.facebook.com/FaroukSystems/videos/564422011180597.

*Primary Examiner* — Bobbak Safaipour
(74) *Attorney, Agent, or Firm* — Birch, Stewart, Kolasch & Birch, LLP

(57) ABSTRACT

The present disclosure is to more accurately provide a dyeing simulation, a terminal may include an input interface for receiving an image, a controller for obtaining a current color and a target color, and a display for displaying a simulation by synthesizing a dyeing image according to the target color in a dyeing area of the image, wherein the controller may display the simulation by limiting an RGB range of the dyeing image based on the current color and the target color.

14 Claims, 7 Drawing Sheets

(a)

(b)

(56) References Cited

U.S. PATENT DOCUMENTS

2023/0146824 A1* 5/2023 Kim .................... A45D 44/005
                                                      700/283
2024/0299564 A1* 9/2024 Chiueh .................. A61P 27/02

FOREIGN PATENT DOCUMENTS

| KR | 10-2014-0087092 A | 7/2014 |
| KR | 10-2015-0071476 A | 6/2015 |
| KR | 10-2016-0147828 A | 12/2016 |
| KR | 10-2020-0071843 A | 6/2020 |
| WO | WO 2020/232300 A1 | 11/2020 |

* cited by examiner

TERMINAL DISPLAYING DYEING SIMULATION AND OPERATION METHOD THEREOF

CROSS-REFERENCE TO RELATED APPLICATIONS

This application claims priority under 35 U.S.C. 119 and 35 U.S.C. 365 to Korean Patent Application No. 10-2021-0057427 (filed on May 3, 2021), which is hereby incorporated by reference in its entirety.

TECHNICAL FIELD

The present disclosure relates to a terminal displaying dyeing simulation and operation method thereof.

BACKGROUND ART

As the IT technology and various applications have been developed, a function for displaying a simulation that predicts a usage result before using cosmetics or hair dyes is being provided.

In particular, in the case of hair dyes, once dyeing, it is difficult to return to an original state even if a desired result is not obtained, and there is a problem that the hair condition is damaged even if the original state is returned, and thus there is a tendency that a need of a user who want to confirm the result before dyeing in advance is increasing.

Meanwhile, the conventional simulation is simply composited and provided with a color to be dyed according to a hair dye in a user's image, and there is a limit that does not consider a current hair color of the user, so that there is a problem of distortion that differs from the actual dyeing result. That is, in the related art, since the simulation is provided in consideration of only the color of the hair dye without considering whether the user's hair is currently dark brown or blonde, there is a problem that the simulation different from the actual dyeing result is provided.

Therefore, a simulation that predicts the dyeing result considering the current hair color of the user is required.

SUMMARY

Technical Problem

The present disclosure is directed to providing a simulation that predicts a dyeing result in consideration of a current hair color of a user.

The present disclosure is directed to providing a simulation that expresses even a difference in dyeing results according to hair dyes having the same color but different brightness.

The present disclosure is directed to providing a simulation close to an actual dyeing result.

Technical Solution

A terminal according to an embodiment of the present disclosure may include an input interface for receiving an image, a controller for obtaining a current color and a target color, and a display for displaying a simulation by synthesizing a dyeing image according to the target color in a dyeing area of the image, wherein the controller may display the simulation by limiting an RGB range of the dyeing image based on the current color and the target color.

The controller may set the RGB range to be brighter as brightness of the current color is darker.

The controller may set the RGB range to a first range when a brightness level of the current color corresponds to a first group, may set the RGB range to a second range of which minimum and maximum values are greater than minimum and maximum values of the first range, respectively when the brightness level of the current color corresponds to a second group darker than the first group, and may set the RGB range to a third range of which minimum and maximum values are greater than the minimum and maximum values of the second range, respectively when the brightness level of the current color corresponds to a third group darker than the second group.

The controller may set the RGB range to be darker as brightness of the target color is darker.

The controller may set the RGB range to a first range when a brightness level of the target color corresponds to a first group, may set the RGB range to a second range of which minimum and maximum values are smaller than minimum and maximum values of the first range, respectively when the brightness level of the target color corresponds to a second group darker than the first group, and may set the RGB range to a third range of which minimum and maximum values are smaller than the minimum and maximum values of the second range, respectively when the brightness level of the target color corresponds to a third group darker than the second group.

The controller may obtain an RGB value and a brightness level based on the target color and may obtain the dyeing image based on the obtained RGB value and brightness level.

The controller may obtain a first weight based on the brightness level and may correct the RGB value based on the first weight.

When the brightness level of the current color is less than or equal to a preset reference level, the controller may obtain a second weight to be applied to a B value among the RGB values.

The terminal may further include a storage for storing data to which a third weight to be applied to the RGB value is mapped based on data according to hair characteristics.

The controller may obtain an RGB value and a brightness level corresponding to the target color, may perform a first process of correcting the obtained RGB value according to the brightness level, may perform a second process of correcting the B value among the first processed RGB values based on the brightness level, may perform a third process of correcting the second processed RGB value based on data according to actual hair characteristics, may perform a fourth process of normalizing the third processed RGB value so as to belong to the RGB range, and may obtain the simulation by synthesizing the dyeing image having the fourth processed RGB value in the dyeing area.

A method of operating a terminal according to an embodiment of the present disclosure may include obtaining a current color and a target color, and displaying a simulation by synthesizing a dyeing image according to the target color in a dyeing area of the image, wherein the displaying of the simulation may include limiting an RGB range of the dyeing image based on the current color and the target color.

The limiting of the RGB range may include setting the RGB range to a first range when a brightness level of the current color corresponds to a first group, setting the RGB range to a second range of which minimum and maximum values are greater than minimum and maximum values of the first range, respectively when the brightness level of the current color corresponds to a second group darker than the first group, and setting the RGB range to a third range of which minimum and maximum values are greater than the minimum and maximum values of the second range, respectively when the brightness level of the current color corresponds to a third group darker than the second group.

The limiting of the RGB range may include setting the RGB range to a first range when a brightness level of the target color corresponds to a first group, setting the RGB range to a second range of which minimum and maximum values are smaller than minimum and maximum values of the first range, respectively when the brightness level of the target color corresponds to a second group darker than the first group, and setting the RGB range to a third range of which the minimum and maximum values are smaller than the minimum and maximum values of the second range, respectively when the brightness level of the target color corresponds to a third group darker than the second group.

The displaying of the simulation may further include obtaining an RGB value and a brightness level based on the target color, and obtaining the dyeing image based on the obtained RGB value.

The displaying of the simulation may include performing a first process of correcting the obtained RGB value according to the brightness level, performing a second process of correcting a B value among the first processed RGB values based on the brightness level, performing a third process of correcting the second processed RGB value based on data according to actual hair characteristics, performing a fourth process of normalizing the third processed RGB value so as to belonging to the RGB range, and obtaining the simulation by synthesizing the dyeing image having the fourth processed RGB value in the dyeing area.

Advantageous Effects

According to an embodiment of the present disclosure, since a simulation that predicts a dyeing result in consideration of a current color is displayed, there is an advantage that an accuracy of the simulation is improved.

According to an embodiment of the present disclosure, since the simulation is displayed in consideration of a brightness level of a target color, there is an advantage that a user can easily confirm not only a color but also a difference in the dyeing result according to a difference in the brightness level.

According to an embodiment of the present disclosure, since the simulation is displayed by reflecting data based on an actual dyeing experience, there is an advantage that it is possible to provide a simulation that closely matches to an actual dyeing result.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated.

The suffixes "module" and "unit" for components used in the description below are assigned or mixed in consideration of easiness in writing the specification and do not have distinctive meanings or roles by themselves.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. May be used herein to describe various elements, these elements should not be limited by these terms. These terms are generally only used to distinguish one element from another.

A singular representation may include a plural representation unless it represents a definitely different refer toing from the context.

Terms such as "include" or "has" are used herein and should be understood that they are intended to represent an existence of several components, functions or steps, disclosed in the specification, and it is also understood that greater or fewer components, functions, or steps may likewise be utilized.

Figure 1:
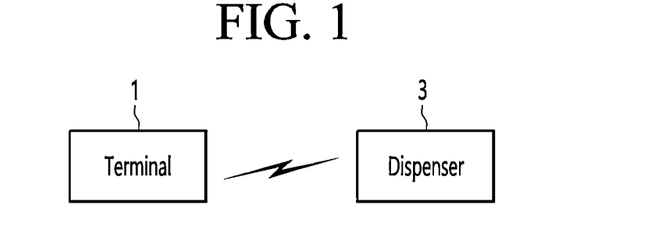
FIG. 1 is a block diagram of a calculation system of a cosmetics manufacturing method according to an embodiment of the present disclosure.

FIG. 1 is a block diagram of a calculation system of a cosmetics manufacturing method according to an embodiment of the present disclosure.

The calculation system of the cosmetics manufacturing method according to the embodiment of the present disclosure may include a terminal 1 and a dispenser 3.

The present disclosure includes a cosmetics manufacturing method system including the terminal 1 for calculating a cosmetics manufacturing method and the dispenser 3 for manufacturing cosmetics. Here, the cosmetics may include not only products used for face and skin of a user such as foundation, basic cosmetics, and color cosmetics, but also products used for nails and toenails of the user such as manicure and gel manicure, and a hair dye used for hair of the user.

Meanwhile, in the present specification, for convenience of description, it has been described that the terminal 1 calculates a method of manufacturing the cosmetics, in particular, the hair dye, and the dispenser 3 manufactures the hair dye, but the embodiment is not limited thereto.

The terminal 1 and the dispenser 3 may communicate with each other by wire or wirelessly.

The terminal 1 may receive an input for controlling an operation of the dispenser 3 from the user, and in this case, the terminal 1 may transmit a signal for controlling the dispenser 3 to operate according to the input information to the dispenser 3.

Specifically, the terminal 1 may receive an input for hair dye-related information, and may calculate the method of manufacturing the hair dye based on the received hair dye-related information. The terminal 1 may transmit the calculated method of manufacturing the hair dye to the dispenser 3, and the dispenser 3 may manufacture the hair dye according to the method of manufacturing the hair dye received from the terminal 1.

The terminal 1 may display various screens for receiving the input for the hair dye-related information.

In addition, the terminal 1 may display operation information of the dispenser 3. For example, the terminal 1 may display a current state of the dispenser 3, information on the hair dye to be provided from the dispenser 3, and a simulation that is a predicted result when the hair dye to be manufactured in the dispenser 3 is used.

The terminal 1 may be a smart phone, but it is merely illustrative, and may include a wearable device such as a smart watch, a tablet PC, a laptop, a desktop, and the like.

The dispenser 3 may be a device that provides a hair dye.

The hair dye described herein is manufactured so as to change a color of the hair, and there may be various types of hair dye such as cream type and foam type.

The dispenser 3 may provide the hair dye according to the signal received from the terminal 1. According to an embodiment, the dispenser 3 is provided with a plurality of hair dye materials, and the hair dye may be manufactured by discharging and/or mixing the provided hair dye materials to provide the hair dye. According to another embodiment, the dispenser 3 may provide the hair dye by providing the hair dye already manufactured for immediate use and discharging the provided hair dye.

Hereinafter, it is assumed that the dispenser 3 provides the hair dye manufactured by discharging and/or mixing the plurality of hair dye materials, but it is merely illustrative for convenience of description, and thus and it is reasonable that the present disclosure is not limited thereto.

Figure 2:
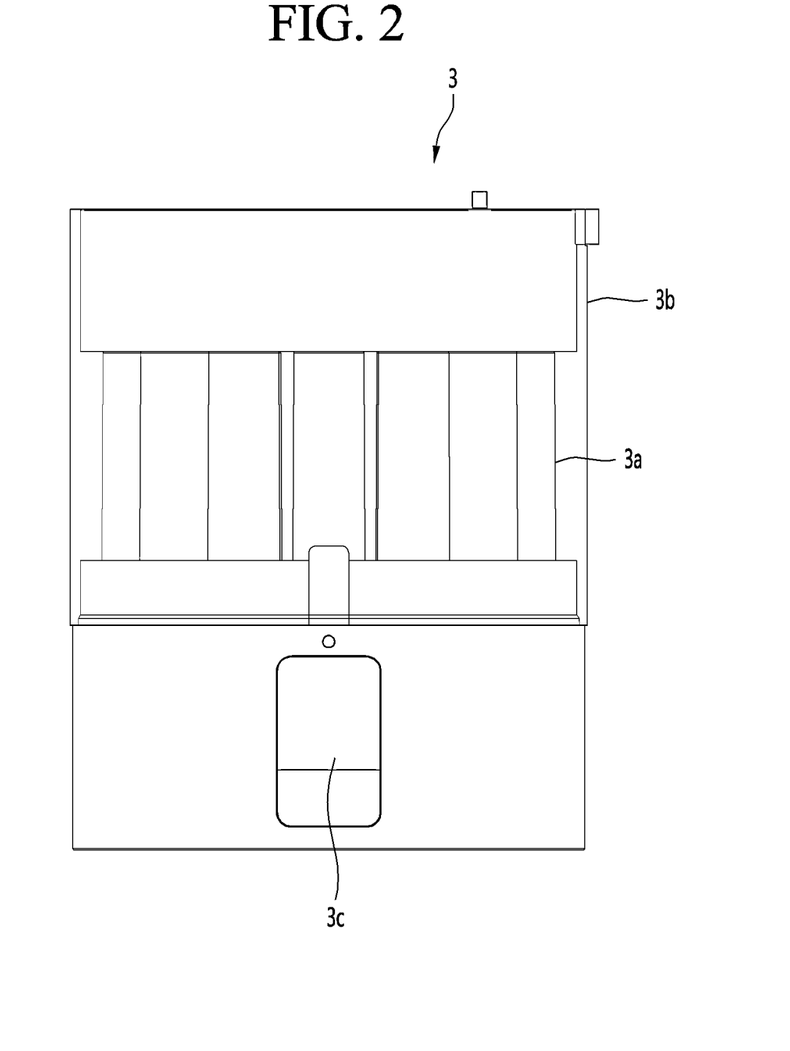
FIG. 2 is a view illustrating a dispenser for providing a hair dye according to an embodiment of the present disclosure.

FIG. 2 is a view illustrating a dispenser for providing a hair dye according to an embodiment of the present disclosure.

The dispenser 3 may include a plurality of cartridges 3a provided with a hair dye material and a case 3b for accommodating the cartridges 3a. Each of the plurality of cartridges 3a may be provided with the hair dye material used for manufacturing the hair dye. In addition, a door 3c through which the hair dye is provided may be formed in the case 3b. The hair dye manufactured in the dispenser 3 may be provided to the user through the door 3c.

Meanwhile, the dispenser 3 shown in FIG. 2 is merely illustrative, and the dispenser 3 may include all devices capable of providing the hair dye.

The hair dye material may include raw materials, compositions, and the like included in the hair dye. That is, the hair dye material may include all raw materials and/or compositions used for manufacturing the hair dye. For example, the hair dye material may include a colorant, an oxidant, a thickener, and the like.

The plurality of cartridges 3a may include a plurality of cartridges containing the colorant, a cartridge containing the oxidant, a cartridge containing the thickener, and the like.

Figure 3:
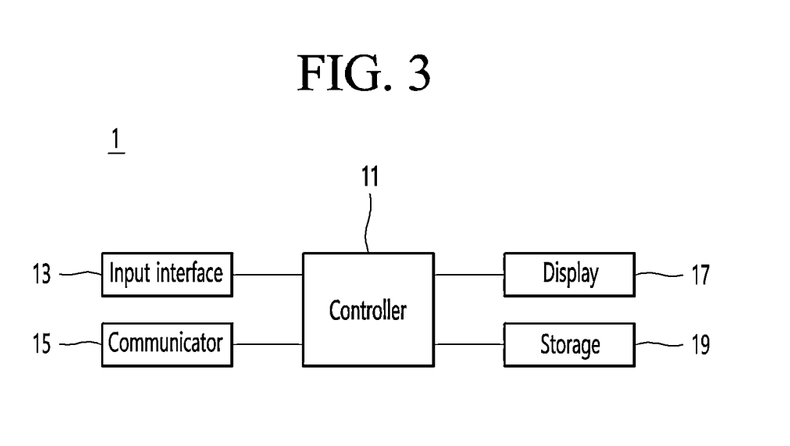
FIG. 3 is a control block diagram of a terminal according to an embodiment of the present disclosure.

FIG. 3 is a control block diagram of a terminal according to an embodiment of the present disclosure.

The terminal 1 may include at least a part or all of a controller 11, an input interface 13, a communicator 15, a display 17, and a storage 19.

The controller 11 may control an overall operation of the terminal 1. The controller 11 may control each of the input interface 13, the communicator 15, the display 17, and the storage 19.

The input interface 13 may receive various types of information from the user. The input interface 13 may receive the hair dye-related information.

The hair dye-related information may refer to information on a hair dye to be manufactured. For example, the hair dye-related information may include information on a current color and a target color.

The current color may refer to a color of a part that the user wants to dye.

The target color may refer to a color predicted to be developed according to the use of the hair dye.

In addition, the hair dye-related information may further include sub-information in addition to the current color and the target color. The sub-information may refer to information on various characteristics other than the color of the hair dye. For example, the sub-information may include information on a dyeing type, a hair dye volume, thickener, oxidant, and the like.

The input interface 13 may be formed of a touch screen or the like, or may include a physical key button.

The communicator 15 may communicate with an external device such as the dispenser 3. The communicator 15 may transmit the method of manufacturing the hair dye to the dispenser 3.

The communicator 15 may include a mobile communication module (not shown) and a short-range communication module (not shown) such as Bluetooth, or the like in order to transmit/receive signals to/from the external device such as the dispenser 3.

In addition, the communicator 15 may communicate with an external server (not shown). The controller 11 may assign a globally unique identifier (GUID) to the calculated hair dye manufacturing method whenever the method of manufacturing the hair dye is calculated, and may control the communicator 15 so as to transmit the assigned GUID to the external server (not shown).

The external server (not shown) may receive the GUID from the terminal 1 or the dispenser 3 and store the received GUID. The external server (not shown) may confirm whether the hair dye is well discharged by matching the hair dye discharged from the dispenser 3 with the GUID.

In addition, the external server (not shown) may store a hair color preferred by the user, such as by store, by region, by age, by member, and by gender.

The display 17 may display a screen for receiving various information input from the user. As an example, the display 17 may display colors for receiving at least one of the current color and the target color. As another example, the display 17 may display a simulation that is a prediction result when a hair dye to be manufactured is used.

As described above, the display 17 may display information related to an operation of the terminal 1 and information related to an operation of the dispenser 3.

The storage 19 may store various information related to the operation of the terminal 1.

For example, the storage 19 may store a code generation method. Specifically, the storage 19 may store the code generation method for generating a code for manufacturing a hair dye corresponding to the information input through the input interface 13. In this case, the code represents the method of manufacturing the hair dye, and may be composed of characters representing the current color, characters representing the target color, characters representing an amount of the hair dye, and characters representing a hair dye formulation. For example, the code P2N8A2Y2 may be a code promised so as to provide cosmetics in which a manufacturing option is permanent, the current color is 2N, the target color is 8A, a cosmetic capacity is 2 oz, a thickener type is cream, and an oxidant capacity is 20 volume, but as each character is changed, the current color, the target color, the amount of the hair dye, the hair dye formulation, etc. May be changed.

In this case, the dispenser 3 may calculate the method of manufacturing the hair dye by decoding the code.

As another example, the storage 19 may store data on the method of manufacturing the hair dye.

The method of manufacturing the hair dye may include a cartridge from which the hair dye material is discharged, and a discharge amount of the hair dye material discharged from each cartridge. In addition, the method of manufacturing the hair dye may further include a dyeing time, a recommended temperature when the hair dye is used, and the like in addition to the cartridge and the discharge amount.

The data on the method of manufacturing the hair dye may include an algorithm for determining the hair dye material to be included in the hair dye as the hair dye-related information is input. Alternatively, the data on the method of manufacturing the hair dye may include a table in which the cartridge to discharge the hair dye material according to each of the current color and the target color and the discharge amount of the hair dye material discharged from each cartridge are mapped in advance. In addition, the cartridge from which the hair dye material is discharged and the discharge amount thereof according to the sub-information in addition to the current color and the target color may further be mapped in a corresponding table.

When the hair dye-related information is input, the controller 11 may calculate the method of manufacturing the hair dye based on the data on the method of manufacturing the hair dye.

Such data may be data generated and updated through experiences of hair designers. Alternatively, the data may be generated based on the method of manufacturing the hair dye generated in advance, and may be updated data as feedback according to a dyeing result is received. In this case, hair dye management, customer management, history management, and big data may be formed.

Meanwhile, the data on the method of manufacturing the hair dye may include a color table representing a plurality of colors. At least one of discharge information for each of the plurality of colors (e.g., FAO, C1C, 898, 514, 190, etc.), a pantone color which is the basis of the simulation (e.g., 1R02, 1Y02, 2Y02, 3Y03, 4Y02, etc.), and the RGB value of the color represented in the color table (e.g., rgb (254, 233, 224), rgb (254, 242, 222, etc.) may be mapped in such a color table.

For example, when a color corresponding to the pantone color 1Y05 and RGB values (251, 200, 162) is selected from the color table, the controller 11 may obtain a hexadecimal 7DB as the discharge information mapped to the selected color. When converting 7DB which is a hexadecimal number into a decimal number, it may be 2011, and it refers that a cosmetic composition of a first cartridge should be discharged by 2, a cosmetic composition of a second cartridge should be discharged by 0, a cosmetic composition of a third cartridge should be discharged by 1, and a cosmetic composition of a fourth cartridge should be discharged by 1. Therefore, the controller 11 may interpret the discharge information of the hexadecimal number mapped to the color selected in the color table to obtain a cartridge from which the hair dye material is to be discharged and a discharge amount of the hair dye material from each cartridge.

In this case, although the discharge information for each color included in the color table is included as a hexadecimal code, a type of cosmetic composition included in each cartridge may be protected.

Meanwhile, the components of the terminal 1 shown in FIG. 3 are merely illustrative, and some of the components shown in FIG. 3 may be omitted or separate components may be added in addition to the components shown in FIG. 3.

Figure 4:
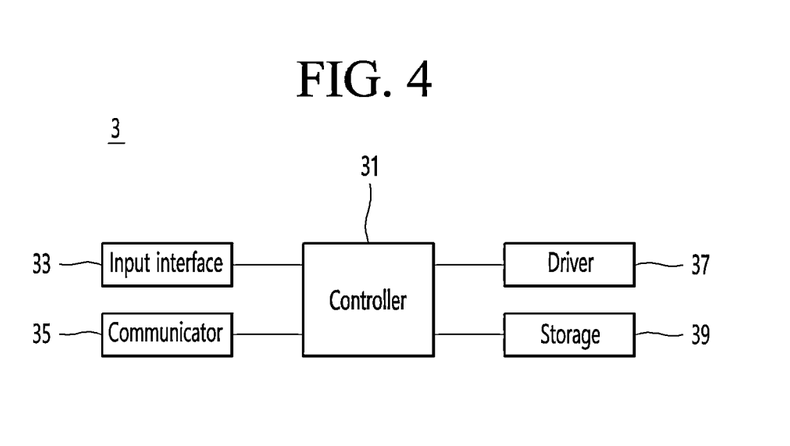
FIG. 4 is a control block diagram of a dispenser according to an embodiment of the present disclosure.

FIG. 4 is a control block diagram of a dispenser according to an embodiment of the present disclosure.

The dispenser 3 may include at least a part or all of a controller 31, an input interface 33, a communicator 35, a driver 37, and a storage 39.

The controller 31 may control an overall operation of the dispenser 3. The controller 31 may control each of the input interface 33, the communicator 35, the driver 37, and the storage 39.

The input interface 33 may receive various types of information from the user. For example, the input interface 33 may receive the hair dye-related information, and in this case, the dispenser 3 may manufacture the hair dye without receiving the method of manufacturing the hair dye from the terminal 1. That is, according to the embodiment, the dispenser 3 may directly receive the hair dye-related information to calculate the method of manufacturing the hair dye.

In addition, the input interface 33 may receive a command of manufacturing the hair dye, a stop command of manufacturing the hair dye, and the like.

The input interface 33 may be formed of a touch screen or the like, or may include a physical key button.

The communicator 35 may communicate with an external device such as the terminal 1. The communicator 35 may receive the method of manufacturing the hair dye from the terminal 1. In addition, the communicator 35 may receive the command of manufacturing the hair dye, the stop command of manufacturing the hair dye, and the like from the terminal 1.

The communicator 35 may include a mobile communication module (not shown) and a short-range communication module (not shown) such as Bluetooth.

The controller 31 may assign the GUID whenever the hair dye is manufactured, and may control the communicator 35 so as to transmit the assigned GUID to an external server (not shown).

The driver 37 may operate so as to provide the hair dye according to the method of manufacturing the hair dye. The driver 37 may discharge the hair dye material accommodated in the at least one cartridge 3a so that the hair dye is provided to the user. For example, the driver 37 may include a cartridge rotation motor (not shown), a discharge motor (not shown), a container transfer motor (not shown), and the like that operate so as to discharge the hair dye material from the at least one cartridge 3a, but it is merely illustrative for convenience of description.

The storage 39 may store information of manufacturing the hair dye. The information of manufacturing the hair dye may include a method of driving the driver 37 so as to manufacture the hair dye according to the method of manufacturing the hair dye.

In addition, the storage 39 may store data for code analysis. For example, the storage 39 may store a code analysis table as data for code analysis. The code analysis table may indicate a type of cartridge to discharge the cosmetic composition for each of the current color and the target color and the discharge amount from each cartridge.

For example, when the controller 31 receives a code such as P5N8V2X2B1, based on the code analysis table, the controller 31 may control so that 14 g of the cosmetic composition is discharged from the fourth cartridge, 1 g of the cosmetic composition is discharged from a fifth cartridge, 15 g of the cosmetic composition is discharged from a eighth cartridge, 15 g of the cosmetic composition is discharged from a eleventh cartridge, and 15 g of the cosmetic composition is discharged from a twelfth cartridge based on the code analysis table.

Therefore, when receiving the code from the terminal 1, the controller 31 may analysis the code based on the code analysis table and control the driver 37 so as to manufacture the hair dye based on analysis information of the code.

Meanwhile, components of the dispenser 3 shown in FIG. 4 are merely illustrative, and some of the components shown in FIG. 4 may be omitted or separate components may be added in addition to the components shown in FIG. 4. For example, the dispenser 3 may further include a display (not shown) for displaying the operation information of the dispenser 3 and the like.

In addition, it has been described above that the terminal 1 calculates the method of manufacturing the hair dye, but the dispenser 3 may also calculate the method of manufacturing the hair dye. Specifically, the storage 39 stores the data on the method of manufacturing the hair dye, the input interface 33 receives the current color and the target color, and the controller 31 may calculate the method of manufacturing the hair dye for dyeing the hair from the current color to the target color based on the data stored in the storage 39.

Meanwhile, according to an embodiment of the present disclosure, at least one of the terminal 1 or the dispenser 3 may display a simulation for predicting a dyeing result before manufacturing the hair dye.

Hereinafter, for convenience of description, it is assumed that the terminal 1 displays a simulation, but it is merely illustrative. That is, the dispenser 3 may display the simulation.

Figure 5:
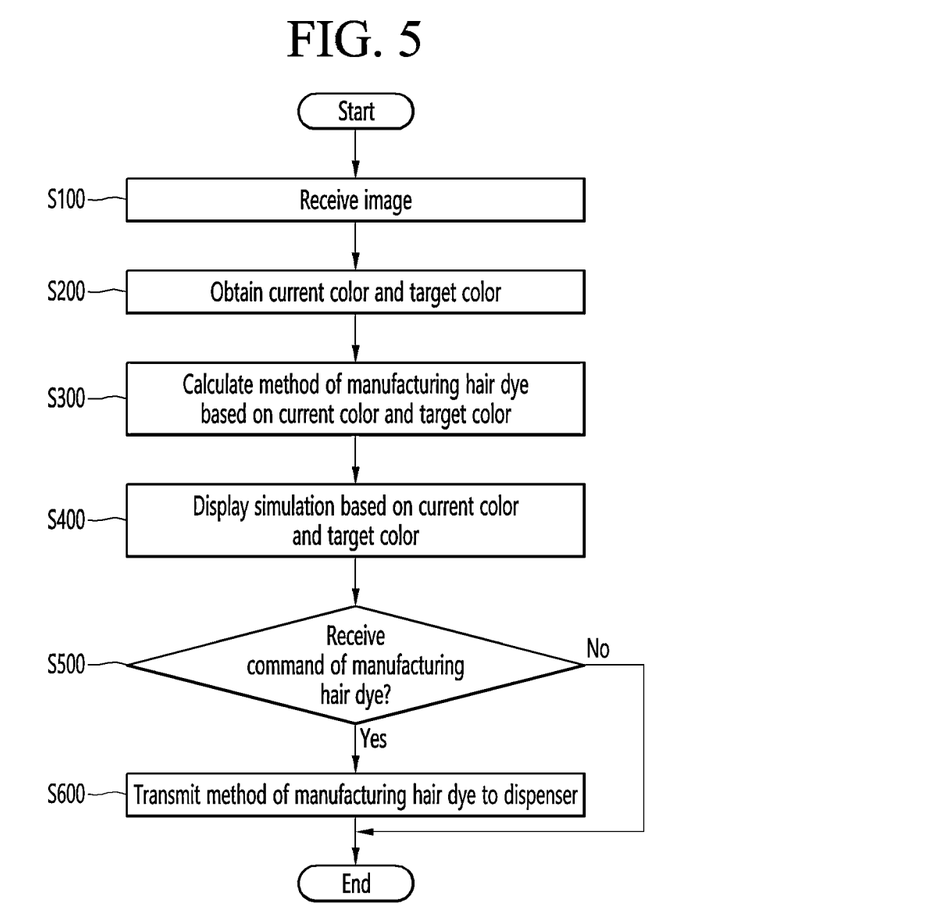
FIG. 5 is a flowchart illustrating a method of displaying a simulation by a terminal according to an embodiment of the present disclosure.

FIG. 5 is a flowchart illustrating a method of displaying a simulation by a terminal according to an embodiment of the present disclosure.

The controller 11 may receive an image (S100).

The image may be an original that is a subject of the simulation, and may include a photograph or a moving image.

For example, the input interface 13 may include a camera (not shown), and the controller 11 may obtain the image by controlling the camera (not shown) to take the photograph or the moving image. That is, the controller 11 may control the camera (not shown) to take the image for displaying the simulation.

In addition, the controller 11 may obtain the image from an external device (not shown) by controlling the communicator 15 so as to communicate with the external device (not shown) by wire or wirelessly.

The controller 11 may obtain the current color and the target color (S200).

The controller 11 may control the input interface 13 so as to obtain the current color. For example, the input interface 13 may receive color information representing the current color. To this end, the user may input the color information representing the current color through the input interface 13. The color information may include a color series, brightness, and the like.

As an example, the display 17 may display the plurality of colors, and the controller 11 may obtain the current color by selecting any one of the plurality of colors through the input interface 13.

As another example, the input interface 13 may include a colorimeter (not shown), and the controller 11 may obtain the current color through a measurement result of the colorimeter (not shown).

In addition, the controller 11 may control the input interface 13 so as to obtain the target color.

For example, when the display 17 displays the plurality of colors, the controller 11 may obtain the target color by selecting any one of the plurality of colors through the input interface 13.

In the present specification, it is assumed that the display 17 displays the plurality of colors having different color series and brightness, and the controller 11 receives any one of the plurality of colors as the current color and the other as the target color.

Figure 6:
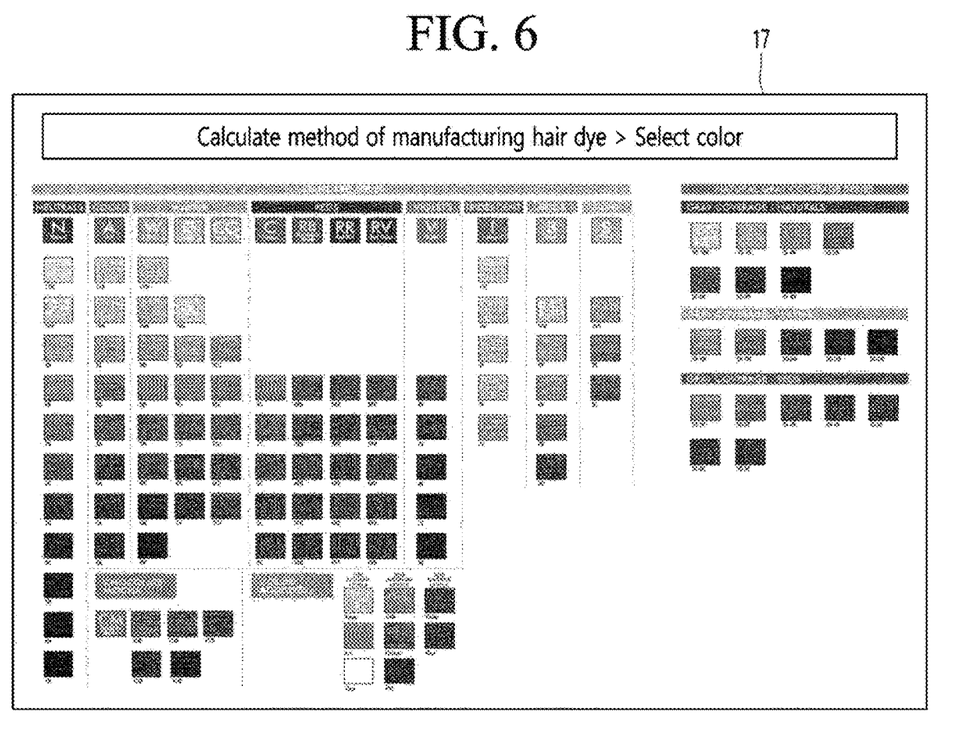
FIG. 6 is an exemplary view for describing a method of obtaining a target color according to an embodiment of the present disclosure.

FIG. 6 is an exemplary view for describing a method of obtaining a target color according to an embodiment of the present disclosure.

Referring to the example of FIG. 6, the display 17 may display a plurality of colors. The controller 11 may control the display 17 so that the plurality of colors are distinguished according to the color series and the plurality of colors belonging to each color series are arranged and displayed in order of brightness.

The controller 11 may receive an input for selecting any one of the plurality of colors, and may obtain the selected color as the target color.

Meanwhile, the method described with reference to FIG. 6 is merely illustrative, and the controller 11 may obtain the target color in various methods.

Again, FIG. 5 will be described.

The controller 11 may calculate the method of manufacturing the hair dye based on the current color and the target color (S300).

The terminal 1 may receive the hair dye-related information including the current color and the target color through the input interface 13, and the controller 11 may calculate the method for manufacturing the hair dye based on the hair dye-related information received through the input interface 13.

The controller 11 may display the simulation based on the current color and the target color (S400).

The controller 11 may control the display 17 so as to display the simulation of predicting the dyeing result for the image based on the current color and the target color. The simulation may be changed depending on at least one of the image, the current color, and the target color.

The controller 11 may obtain an RGB value and a brightness level based on the target color, and may display an obtained simulation based on the obtained RGB value and brightness level. A method of obtaining and displaying the simulation will be described in more detail with reference to FIG. 7.

The controller 11 may acquire whether a command of manufacturing the hair dye is received after displaying the simulation (S500).

The controller 11 may determine whether the command of manufacturing the hair dye has been received after displaying the simulation.

When the command of manufacturing the hair dye is not received, the controller 11 may end the operation.

When the command of manufacturing the hair dye is received, the controller 11 may transmit the method of manufacturing the hair dye to the dispenser 3 (S600).

That is, when the command of manufacturing the hair dye is received, the controller 11 may transmit the method of manufacturing the hair dye to the dispenser 3 so that the hair dye is manufactured according to the method of manufacturing the hair dye.

Figure 7:
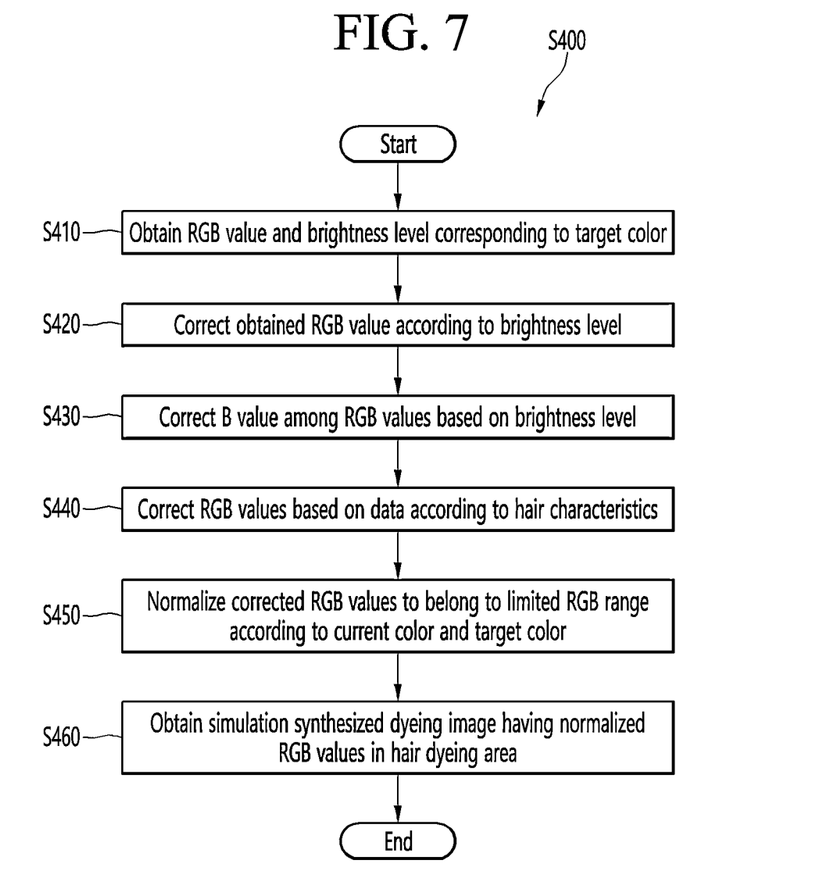
FIG. 7 is a flowchart illustrating a method of displaying a simulation according to an embodiment of the present disclosure.

Next, a method of displaying a simulation according to an embodiment of the present disclosure will be described in detail with reference to FIG. 7. FIG. 7 is a flowchart illustrating the method of displaying the simulation according to an embodiment of the present disclosure. FIG. 7 may be a flowchart in which the step S400 of FIG. 5 is embodied.

The controller 11 may obtain the RGB value and the brightness level corresponding to the target color (S410).

Specifically, the storage 19 may store by mapping RGB values and brightness levels to each of a plurality of hair dye colors. Specifically, various types of hair dyes having different color series or brightness are provided, and when the color series is the same, the RGB values may be the same, and when the brightness is the same, the brightness level may be the same. Accordingly, the controller 11 may obtain an RGB value according to a color series corresponding to the target color, and may obtain a brightness level according to the brightness corresponding to the target color.

In this case, the RGB values and brightness levels mapped to each of the plurality of hair dye colors may be result values measured for the dyed hair by the colorimeter (not shown), but it is merely illustrative, and it may include an input value of a result visually felt by the user for the dyed hair, a color value when the dyed hair is expressed on the display 17, and the like.

The controller 11 may obtain the RGB value and the brightness level corresponding to the target color by extracting the RGB value and the brightness level mapped to the target color from the storage 19.

For example, the controller 11 may obtain (62, 54, 43) as the RGB value corresponding to the target color, and may obtain a seventh level as the brightness level.

The controller 11 may correct the obtained RGB value according to the obtained brightness level (S420).

Specifically, the storage 19 may store by mapping the weight to each of a plurality of brightness levels.

According to an embodiment, a weight difference between brightness levels may be constant. For example, the storage 19 may store by mapping a weight of 100 to a fourth level, a weight of 150 to a fifth level, a weight of 200 to a sixth level, a weight of 250 to a seventh level, a weight of 300 to an eighth level, and a weight of 350 to a ninth level. That is, a difference in weight per level may be constant at 50, but it is merely illustrative for convenience of description, and thus the embodiment is not limited thereto. If a brightness level of the current color is input as the seventh level, the controller 11 may obtain the weight of 250. Here, the weight is a first weight and may be applied to the RGB value based on the brightness level. The first weight is only limited to be distinguished from second and third weights, and thus the embodiment is not limited thereto.

The controller 11 may correct the RGB value by calculating an RGB ratio based on the RGB value and multiplying the RGB ratio by the weight according to the brightness level.

As a specific example, when the RGB value obtained in the step S410 is (62, 54, 43), the controller 11 may obtain corrected RGB values (97, 85, 71) by calculating RGB ratios (38.99%, 33.96%, 27.04%) through (R/Sum of RGB, G/Sum of RGB, B/Sum of RGB) and multiplying each of the calculated RGB ratios (38.99%, 33.96%, 27.04%) by the weight of 250.

As described above, by correcting the RGB values by applying the weight corresponding to the brightness level, the present disclosure has an advantage that it is possible to more accurately express the difference in the dyeing result depending on the brightness level of the current color by simulation. Specifically, when weights are not separately applied, there is an advantage that it is possible to minimize a problem that a brightness difference is hardly revealed in the simulation even though the brightness levels are different. In addition, by constantly applying the weight difference between the levels, there is an advantage that the simulation may be applied to a consistent brightness level by linearly dividing the brightness difference.

In addition, the present disclosure has an advantage that it is possible to provide a simulation in which only the brightness is adjusted without changing the color because the RGB value is adjusted while maintaining the RGB ratio because the RGB ratio is multiplied by a weight, not the obtained RGB value itself.

The controller 11 may correct a B value among the RGB values based on the brightness level (S430).

Specifically, when the brightness level is less than or equal to a preset reference level, the controller 11 may apply a weight to the B value.

The reference level may be preset as a default or may be set through user input. For example, the reference level may be the seventh level, but it is merely illustrative, and thus the embodiment is not limited thereto.

In addition, the weight may be a fixed constant. According to an embodiment, the controller 11 may correct the B value to a value increased by a ratio corresponding to the weight. For example, when the weight is 5, the controller 11 may correct the B value to a value increased by 5%. Here, the weight is the second weight and may be applied to the RGB value based on the brightness level. The second weight is only limited to be distinguished from the first and third weights, and thus the embodiment is not limited thereto.

This is for expressing an actual dyeing result, which is expressed with low saturation when dyeing with a hair dye having low brightness, by the simulation, and there is an advantage that the simulation may be expressed so that the saturation becomes low as in reality by correcting the B value as described above.

The controller 11 may correct the RGB values based on data according to hair characteristics (S440).

The data according to the hair characteristics may be data in which weights to be applied to each RGB for each target are mapped so that a difference in color actually expressed in the hair is adjusted according to the color of the hair dye when the hair is dyed. The weight may be a constant. Here, the weight is a third weight and may be applied to RGB values based on the data according to the hair characteristics. The third weight is only limited to be distinguished from the first and second weights, and thus the embodiment is not limited thereto.

The data according to such hair characteristics may be stored and corrected through user input as data obtained through actual experience.

The data according to the hair characteristics may be in a form of a table, and as an example, as shown in Table 1 below, but it is merely illustrative.

TABLE 1

| Red violet | 0.78 | 0.08 | 0.52 |
| Blue Viloet | 0.54 | 0.17 | 0.89 |
| Blue | 0 | 0 | 1 |
| Blue Green | 0.05 | 0.6 | 0.73 |
| Green | 0 | 1 | 0 |
| Yellow orange | 1 | 0.82 | 0 |
| Red orange | 1 | 0.49 | 0.3 |
| Red | 1 | 0 | 0 |
| Silver | 0.75 | 0.75 | 0.75 |
| Dark Grey | 0.66 | 0.66 | 0.66 |

The controller 11 may correct each RGB value by applying the weight to a preset algorithm. This is for expressing even a dyeing result according to actual hair characteristics by a simulation, and there is an advantage that the accuracy of the simulation may be improved.

The controller 11 may normalize the corrected RGB values to belong to a limited RGB range according to the current color and the target color (S450).

According to an embodiment, the controller 11 may limit an RGB range of a dyeing image to be synthesized in a dyeing area according to the current color and the target color. This is to minimize a problem that the simulation is displayed in distorted colors when synthesizing dyeing images having the same RGB value because the target colors are the same even though the current colors are different.

The controller 11 may set the RGB range to be brighter as the brightness of the current color is darker. Specifically, the controller 11 may set the RGB range to a first range when the brightness level of the current color corresponds to a first group, may set the RGB range to a second range of which minimum and maximum values are greater than minimum and maximum values of the first range when the brightness level of the current color corresponds to a second group darker than the first group, and may set the RGB range to a third range of which minimum and maximum values are greater than the minimum and maximum values of the second range when the brightness level of the current color corresponds to a third group darker than the second group. The controller 11 may normalize the RGB values for a range of 0 to 255 to be adjusted to the RGB values corresponding to a set RGB range. In this case, the first range may be 120 to 220, the second range may be 130 to 230, and the third range may be 140 to 250, but it is merely illustrative, and thus the embodiment is not limited thereto.

In addition, the controller 11 may set the RGB range to be darker as brightness of the target color is darker. Specifically, the controller 11 may set the RGB range to a first range when a brightness level of the target color corresponds to a first group, may set the RGB range to a second range of which minimum and maximum values are smaller than minimum and maximum values of the first range when the brightness level of the target color corresponds to a second group darker than the first group, and may set the RGB range to a third range of which minimum and maximum values are smaller than the minimum and maximum values of the second range when the brightness level of the target color corresponds to a third group darker than the second group. In this case, the first range may be 120 to 220, the second range may be 40 to 140, and the third range may be 0 to 100, but it is merely illustrative, and thus the embodiment is not limited thereto.

In addition, the first group may be a group having a brightness level of the seventh to ninth levels, the second group may be a group having a brightness level of the fourth to sixth levels, and the third group may be a group having a brightness level of the first to third levels, but it is merely illustrative, and thus the embodiment is not limited thereto.

Hereinafter, Table 2 is a table summarizing the RGB range limited according to the current color and the target color according to the above-described example, but this is only an example for convenience of description, and thus the embodiment is not limited thereto.

TABLE 2

| | | Current color | | |
| --- | --- | --- | --- | --- |
| | RGB range | Light color hair (First group) | Medium color hair (Second group) | Dark color hair (Third group) |
| Target color | Light color hair (First group) | 120~220 | 130~230 | 140~250 |
| | Medium color hair (Second group) | 40~140 | 50~150 | 60~180 |
| | Dark color hair (Third group) | 0~100 | 10~110 | 20~120 |

In summary, if the controller 11 sets the RGB range to the first range when the current color of the hair is light color, the RGB range may be set to the second range shifted to a brighter side than the first range when the current color of the hair is medium color, and the RGB range may be set to a third range shifted to a brighter side than the second range when the current color of the hair is dark color. In addition, the controller 11 may set the ranges by shifting the RGB range to a darker range as the target color becomes darker.

That is, the controller 11 may limit the RGB values of the dyeing image to a specific range based on the current color and the target color. The minimum and maximum RGB values of the dyeing image may be determined based on the current color and the target color.

There may be various methods to normalize the RGB values for the range of 0 to 255 to belong in the limited RGB range. For example, the controller 11 may normalize by adjusting each of the RGB values based on a ratio between a size in the range of 0 to 255 and a size in the limited RGB range, but it is merely illustrative, and thus it is reasonable that the embodiment is not limited thereto.

The controller 11 may obtain a simulation of synthesizing a dyeing image having a normalized RGB value in the dyeing area (S460).

That is, the controller 11 may obtain the simulation by extracting a dyeing area from a user image and synthesizing the dyeing image having the normalized RGB value in the dyeing area.

As described above, there is an advantage that it is possible to provide a simulation dyed with a color according to the target color regardless of the brightness of the current color by limiting the RGB range based on the current color and the target color.

Meanwhile, the controller 11 may obtain the simulation through the various steps described above so that the simulation is displayed close to the actual dyeing result. However, according to an embodiment, the controller 11 may obtain the simulation by omitting at least some of the above-described various steps. That is, it is illustrated in FIG. 7 that S420, S430, S440, and S450 are all performed, but the controller 11 obtains the RGB value and the brightness level corresponding to the target color, and then, the simulation may be obtained by applying an RGB value obtained by performing at least one of S420, S430, S440 and S450.

For example, the controller 11 may obtain an RGB value and a brightness level corresponding to the target color, perform a first process of correcting the obtained RGB value according to the brightness level, perform a second process of correcting the B value among the first processed RGB values based on the brightness level, perform a third process of correcting the second processed RGB value based on data according to actual hair characteristics, perform a fourth process of normalizing the third processed RGB value so as to belong to the RGB range, and obtain a simulation by synthesizing a dyeing image having the fourth processed RGB value in the dyeing area. Alternatively, the controller 11 may obtain RGB values and brightness levels corresponding to the target color, perform at least one of the above-described first to fourth processes in the dyeing area, and obtain a simulation by synthesizing a dyeing image having a corrected RGB value.

Figure 8:
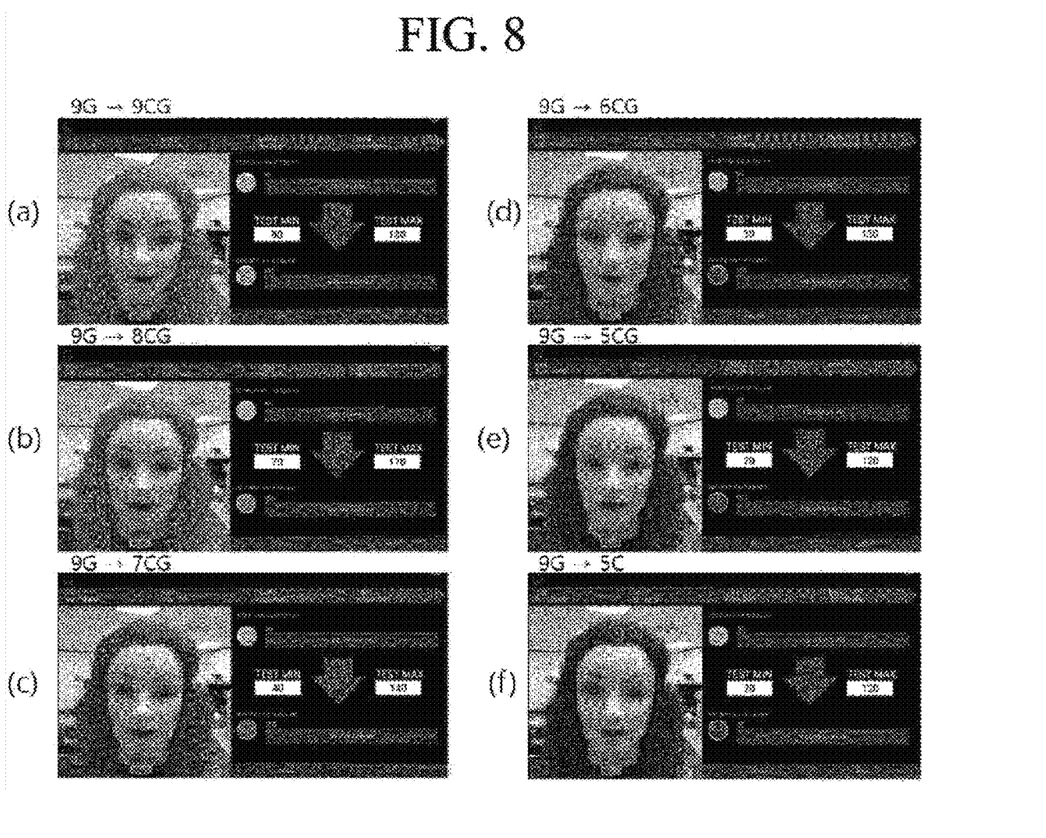
FIG. 8 is an exemplary view of a simulation according to an embodiment of the present disclosure.

FIG. 8 is an exemplary view of a simulation according to an embodiment of the present disclosure.

In FIG. 8, 9G may refer to a gold color with a brightness level of 9, 9CG may refer to a copper gold color with a brightness level of 9, 8CG may refer to a copper gold color with a brightness level of 8, 7CG may refer to a copper gold color with a brightness level of 7, 6CG may refer to a copper gold color with a brightness level of 6, 5CG may refer to a copper gold color with a brightness level of 5, and 5C may refer to a copper color with a brightness level of 5.

In addition, TEST MIN and TEST MAX shown respectively in (a) to (f) of FIG. 8 may represent the minimum and maximum values of RGB as the RGB range is limited respectively.

(a) to (f) of FIG. 8 may be simulations when target colors are 9CG 8CG, 7CG 6CG 5CG and 5C, respectively, with respect to the same image having a current color of 9G. Referring to (a) to (e) of FIG. 8, it can be confirmed that a difference in dyeing results according to the same color series or brightness level is clearly shown through the simulations. In addition, referring to (e) and (f) of FIG. 8, it can be confirmed that the difference in dyeing results is clearly shown through the simulations according to the same brightness level or color series.

Figure 9:
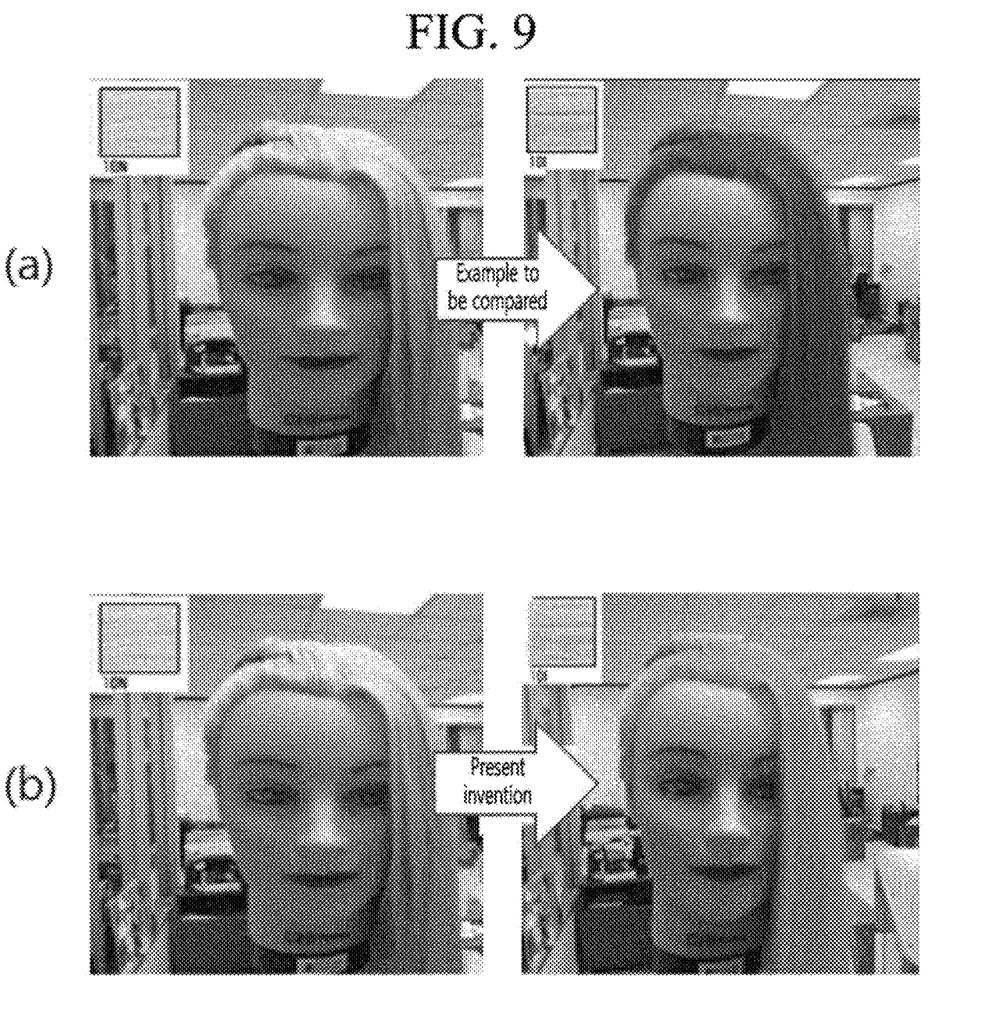
FIG. 9 is an exemplary view illustrating a simulation and a comparative example thereof according to an embodiment of the present disclosure.

FIG. 9 is an exemplary view illustrating a simulation according to an embodiment of the present disclosure and a comparative example thereof.

(a) of FIG. 9 is a result of synthesizing a dyeing image having an RGB value corresponding to the target color in the dyeing area of the image when the current color is 10N (a natural color with a brightness level of 10) and the target color is 10I (an iridescent color with a brightness level of 10). (b) of FIG. 9 may be a simulation according to the embodiment of the present disclosure when the current color and the target color are the same as (a) of FIG. 9. That is, (b) of FIG. 9 is a result of synthesizing a dyeing image having an RGB value in which the first to fourth processes are performed in the dyeing area of the image.

Referring to (a) of FIG. 9, since the dyeing image of the RGB value corresponding to the target color was simply synthesized without considering the current color, the result of dyeing with a color completely different from the target color was derived. However, referring to (b) of FIG. 9, since the dyeing image of an RGB value corrected in consider-ation of the current color was synthesized, the result of dyeing with the target color was derived. Through this, when the simulation is displayed according to the embodiment of the present disclosure, there is an advantage that the dyeing result according to the target color may be accurately expressed without distortion.

The present disclosure described above may be implemented as a computer readable code in a medium in which a program is recorded. A computer readable medium includes all types of recording devices in which data readable by a computer system is stored. Examples of the computer readable medium include a hard disk drive (HDD), a solid state disk (SSD), a silicon disk drive (SDD), a read-only memory (ROM), a random-access memory (RAM), a CD-ROM, a magnetic tape, a floppy disk, an optical data storage system, and the like. In addition, the computer may include the controller of the terminal 1 or the controller 31 of the dispenser 3. Therefore, the above detailed description should not be construed as restrictive in all respects but should be considered exemplary. The scope of the present disclosure should be determined by a reasonable interpretation of the appended claims, and all modifications within the equivalent scope of the present disclosure are within the scope of the present disclosure.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

What is claimed is:
1. A terminal comprising:
an input interface configured to receive an image;
a controller configured to obtain a current color and a target color; and
a display configured to display a simulation by synthesizing a dyeing image according to the target color in a dyeing area of the image,
wherein the controller is configured to display the simulation by limiting an RGB range of the dyeing image based on the current color and the target color,
wherein the RGB range is divided into a plurality of ranges with different minimum and maximum values, and
wherein the controller is configured to set the RGB range of the dyeing image to one of the plurality of ranges divided according to a group to which a brightness level of the current color or a brightness level of the target color corresponds,
wherein the controller is configured to set the RGB range to be brighter as brightness of the current color is darker, and
wherein the controller is further configured to:
set the RGB range to a first range when the brightness level of the current color corresponds to a first group, set the RGB range to a second range of which minimum and maximum values are greater than minimum and maximum values of the first range, respectively when the brightness level of the current color corresponds to a second group darker than the first group, and set the RGB range to a third range of which minimum and maximum values are greater than the minimum and maximum values of the second range, respectively when the brightness level of the current color corresponds to a third group darker than the second group.

2. The terminal of claim 1, wherein the controller is configured to set the RGB range to be darker as brightness of the target color is darker.

3. The terminal of claim 2, wherein the controller is further configured to:

set the RGB range to the first range when the brightness level of the target color corresponds to the first group, set the RGB range to the second range of which the minimum and maximum values are smaller than the minimum and maximum values of the first range, respectively when the brightness level of the target color corresponds to the second group darker than the first group, and set the RGB range to the third range of which the minimum and maximum values are smaller than the minimum and maximum values of the second range, respectively when the brightness level of the target color corresponds to the third group darker than the second group.

4. The terminal of claim 1, wherein the controller is configured to obtain an RGB value and the brightness level based on the target color and obtain the dyeing image based on the obtained RGB value and the brightness level based on the target color.

5. The terminal of claim 4, wherein the controller is configured to obtain a first weight based on the brightness level based on the target color and correct the RGB value based on the first weight.

6. The terminal of claim 4, wherein when the brightness level of the current color is less than or equal to a preset reference level, the controller is configured to obtain a second weight to be applied to a B value among the RGB values.

7. The terminal of claim 4, further comprising a storage configured to store data to which a third weight to be applied to the RGB value is mapped based on data according to hair characteristics.

8. The terminal of claim 1, wherein the controller is configured to:

obtain an RGB value and the brightness level of the target color, perform a first process of correcting the obtained RGB value according to the brightness level of the target color, perform a second process of correcting a B value among the first processed RGB values based on the brightness level of the target color, perform a third process of correcting the second processed RGB value based on data according to actual hair characteristics, perform a fourth process of normalizing the third processed RGB value so as to belong to the RGB range, and obtain the simulation by synthesizing the dyeing image having the fourth processed RGB value in the dyeing area.

9. A method of operating a terminal, the method comprising:

receiving an image;

obtaining a current color and a target color; and displaying a simulation by synthesizing a dyeing image according to the target color in a dyeing area of the image, wherein the displaying of the simulation includes limiting an RGB range of the dyeing image based on the current color and the target color, wherein the RGB range is divided into a plurality of ranges with different minimum and maximum values, and wherein the limiting of the RGB range includes setting the RGB range of the dyeing image to one of the plurality of ranges divided according to a group to which a brightness level of the current color or a brightness level of the target color corresponds, wherein the setting of the RGB range includes:

setting the RGB range to a first range when the brightness level of the current color corresponds to a first group, setting the RGB range to a second range of which minimum and maximum values are greater than minimum and maximum values of the first range, respectively when the brightness level of the current color corresponds to a second group darker than the first group, and setting the RGB range to a third range of which minimum and maximum values are greater than the minimum and maximum values of the second range, respectively when the brightness level of the current color corresponds to a third group darker than the second group.

10. The method of operating the terminal of claim 9, wherein, the setting of the RGB range further includes:

setting the RGB range to the first range when the brightness level of the target color corresponds to the first group, setting the RGB range to the second range of which the minimum and maximum values are smaller than the minimum and maximum values of the first range, respectively when the brightness level of the target color corresponds to the second group darker than the first group, and setting the RGB range to the third range of which the minimum and maximum values are smaller than the minimum and maximum values of the second range, respectively when the brightness level of the target color corresponds to the third group darker than the second group.

11. The method of operating the terminal of claim 9, wherein the displaying of the simulation further includes:

obtaining an RGB value and the brightness level based on the target color, and obtaining the dyeing image based on the obtained RGB value.

12. The method of operating the terminal of claim 11, wherein the displaying of the simulation includes:

performing a first process of correcting the obtained RGB value according to the brightness level based on the target color, performing a second process of correcting a B value among the first processed RGB values based on the brightness level based on the target color, performing a third process of correcting the second processed RGB value based on data according to actual hair characteristics, performing a fourth process of normalizing the third processed RGB value so as to belonging to the RGB range, and obtaining the simulation by synthesizing the dyeing image having the fourth processed RGB value in the dyeing area.

13. A terminal comprising:

an input interface for receiving an image;

a controller for obtaining a current color and a target color; and a display for displaying a simulation by synthesizing a dyeing image according to the target color in a dyeing area of the image, wherein the controller obtains an RGB value and brightness level corresponding to the target color, performs a first process of correcting the obtained RGB value according to the brightness level, performs a second process of correcting a B value among the first processed RGB values based on the brightness level, performs a third process of correcting the second processed RGB value based on data according to actual hair characteristics, performs a fourth process of normalizing the third processed RGB value so as to belonging to an RGB range determined based on the current color and the target color, and obtains the simulation by synthesizing the dyeing image having the fourth processed RGB value in the dyeing area.

14. A method of operating a terminal, comprising:

receiving an image;

obtaining a current color and a target color; and displaying a simulation by synthesizing a dyeing image according to the target color in a dyeing area of the image, wherein the displaying of the simulation includes obtaining an RGB value and a brightness level based on the target color, performing a first process of correcting the obtained RGB value according to the brightness level, performing a second process of correcting a B value among the first processed RGB values based on the brightness level, performing a third process of correcting the second processed RGB value based on data according to actual hair characteristics, performing a fourth process of normalizing the third processed RGB value so as to belonging to an RGB range determined based on the current color and the target color, and obtaining the simulation by synthesizing the dyeing image having the fourth processed RGB value in the dyeing area.

* * * * *